INVENTOR.
EDWIN S. LEE, III
BY
Christie, Parker & Hale
ATTORNEYS.

Dec. 24, 1968 E. S. LEE III 3,418,639

ASSOCIATIVE MEMORY EMPLOYING NON-DESTRUCTIVE READOUT OF BINARY ELEMENTS

Filed May 6, 1963 6 Sheets-Sheet 2

INVENTOR
EDWIN S. LEE, III

BY
Christie, Parker & Hale
ATTORNEYS.

Dec. 24, 1968 E. S. LEE III 3,418,639

ASSOCIATIVE MEMORY EMPLOYING NON-DESTRUCTIVE READOUT OF BINARY ELEMENTS

Filed May 6, 1963 6 Sheets-Sheet 3

| | INFORMATION CONTENT | | | ASSOC. CELL | |
|---|---|---|---|---|---|
| | COMPARE CELL-30 | DON'T CARE CELL-32 | ASSOC. CELL-10 | READ OUTPUT | WMD-14 OUTPUT ($e_o$) |
| | 0 | 1 | 0 | 0 | T |
| | 0 | 1 | 1 | 1 | F |
| | 1 | 1 | 0 | 0 | F |
| | 1 | 1 | 1 | 1 | T |
| DON'T CARE STATE | 0 | 0 | 0 | 0 | T |
| DON'T CARE STATE | 0 | 0 | 1 | 1 | T |
| DON'T CARE STATE | 1 | 0 | 0 | 0 | T |
| DON'T CARE STATE | 1 | 0 | 1 | 1 | T |

INVENTOR.
EDWIN S. LEE, III

BY Christie, Parker & Hale
ATTORNEYS.

INVENTOR.
EDWIN S. LEE, III
BY
Christie, Parker & Hale
ATTORNEYS.

INVENTOR.
EDWIN S. LEE, III
BY
Christie Parker & Hale
ATTORNEYS.

INVENTOR.
EDWIN S. LEE, III
BY
Christie Parker & Hale
ATTORNEYS.

3,418,639

ASSOCIATIVE MEMORY EMPLOYING NON-DESTRUCTIVE READOUT OF BINARY ELEMENTS

Edwin S. Lee III, Altadena, Calif., assignor to Burroughs Corporation, Detroit, Mich., a corporation of Michigan
Filed May 6, 1963, Ser. No. 278,021
24 Claims. (Cl. 340—173)

This invention relates to memory systems and more particularly to improved associative memory systems and associative cells therefor.

Memory systems have been developed whereby the information stored in the memory system may be obtained without any indication of the physical location of a particular piece of information in the memory system. These memory systems are known as associative memory systems or content address memory systems. Addresing takes place in associative memory systems by simultaneously comparing the contents of all of the memory elements in order to determine whether a piece of information or a word of information that is undergoing comparison is contained in the memory and, if so, an indication is formed of such location in the memory so as to allow the particular location to be operated on either for reading or writing purposes. Associative memories are known which utilize such elements as cryogenic elements or magnetic circuit elements.

The deposition of complete circuits on substrates is a circuit technique which has been developed for making complete circuits at low unit cost at high volume. The present invention provides an improved associative memory system employing an improved solid state associative cell that is readily adaptable to be manufactured as an integrated circuit and thereby allow an inexpensive memory system to be constructed. The solid state associative memory system and cells of the present invention provide a system and cells which work at room temperature using standard components which are presently available, in contrast to the non-standard low temperature techniques required for cryogenic memories. Memory systems embodying the present invention have been found to be cheaper than memories using cryogenic techniques at least for systems having in the order of 10,000 bits of storage or less.

There are also a number of important advantages in an associative memory system and cells constructed in accordance with the present invention over associative memory systems using magnetic techniques. For example, in a specific embodiment of the present invention, the cells of the associative memory system have gain rather than loss in signal allowing more logical flexibility and eliminating the need for additional costly amplifiers as required in magnetic associative memory systems. Additionally, the signal to noise ratio in a system constructed in accordance with the present invention is over 1,000 times better than that in a system using magnetic techniques. Additionally, the output signal from an associative memory constructed in accordance with the present invention for read and compare indications is a direct current signal rather than an output pulse, thereby reducing the amount of required control equipment. Also, the drive signals and component tolerances using solid state cells may vary plus or minus 50% in contrast to magnetic memory cells where these tolerances may vary only in the order of plus or minus 10%. Additionally, the expensive drivers and sense amplifiers required for magnetic core associative memories are eliminated. An advantage over both magnetic and cryogenic associative memories is that the input and output signals are on approximately the same energy levels thereby eliminating deleterious cross-talk problems.

The present invention is an improvement of a copending patent application entitled "Memory System" bearing Ser. No. 236,310, filed on Nov. 8, 1962, by Edwin S. Lee, III, and assigned to the same assignee as the present invention.

The associative memory cells and systems to which the instant invention is directed are improved over the basic associative cell and systems disclosed in the patent application "Memory System" in a number of respects. For example, readout capabilities quite similar to conventional memory cells are provided, thereby allowing the storage content of a word of storage in the system to be read out of the memory from the other words. Additionally, the read and write control circuits of a specific memory cell constructed in accordance with the present invention have a common point and may be connected together to the same terminals of other associative cells in the associative memory system. This is quite important in that the read and write control circuits of all cells connected in common may be connected together in common to a single output terminal of a single read and write control unit. Also, the common read and write control junction allows word selection for both reading and writing with a minimum of equipment. An additional improvement of the present invention over the basic associative cell described in the patent application "Memory System" is that compare and read operations may take place simultaneously in time. Further, a single phase of operation is needed for either reading or writing in associative cells.

It should also be noted that the invention is also applicable to conventional types of memory systems and cells. The cells have read out and write capabilities which make them readibly adaptable to memory systems other than the associative type. The integrated circuit techniques make such memory cells practical especially in small memory systems.

Briefly, an embodiment of the present invention is an associative memory cell comprising first and second switching devices having input, output and control circuits, the input circuits being connected to a source of read or write signals and the output-control circuits being symmetrically connected through impedance means to individual potential sources of signals and being regeneratively cross coupled to cause the switching devices to alternately conduct for defining two stable states, and means coupled to the individual output circuits of the switching devices and adapted for forming a unique indication of a predetermined relationship between the storage state of the switching devices and a state represented by potentials applied to the impedance means by such individual potential sources.

An embodiment of the present invention also includes first and second switching devices having input, output and control circuits, the output-control circuits of each of the switching devices being symmetrically connected through individual impedance means to individual potential sources and being regeneratively cross coupled to cause the switching devices to alternately conduct for defining two stable states, the input circuits of said switching devices being connected together to a source of write control signals and the switching devices being adapted for switching into a conductive state corresponding to that defined by a signal applied to such impedance means by such individual potential sources responsive to an applied write control signal.

An embodiment of the present invention having a read feature includes first and second switching devices having input, output and control circuits, the output-control circuits of each of the switching devices being symmetrically connected through separate impedance means to a potential source and being regeneratively cross coupled through impedance means for causing the switching devices to alternately conduct for defining two stable states, the input circuits of said switching devices being coupled together to a source of read control signals and circuit means coupled to the output circuit of at least one of the switching devices and adapted for forming a unique signal indicative of a predetermined state of the switching devices in response to a read control signal applied at said input circuits.

These and other features of the present invention may be more fully appreciated when considered in light of the following specification and drawings, in which.

Figure 1:
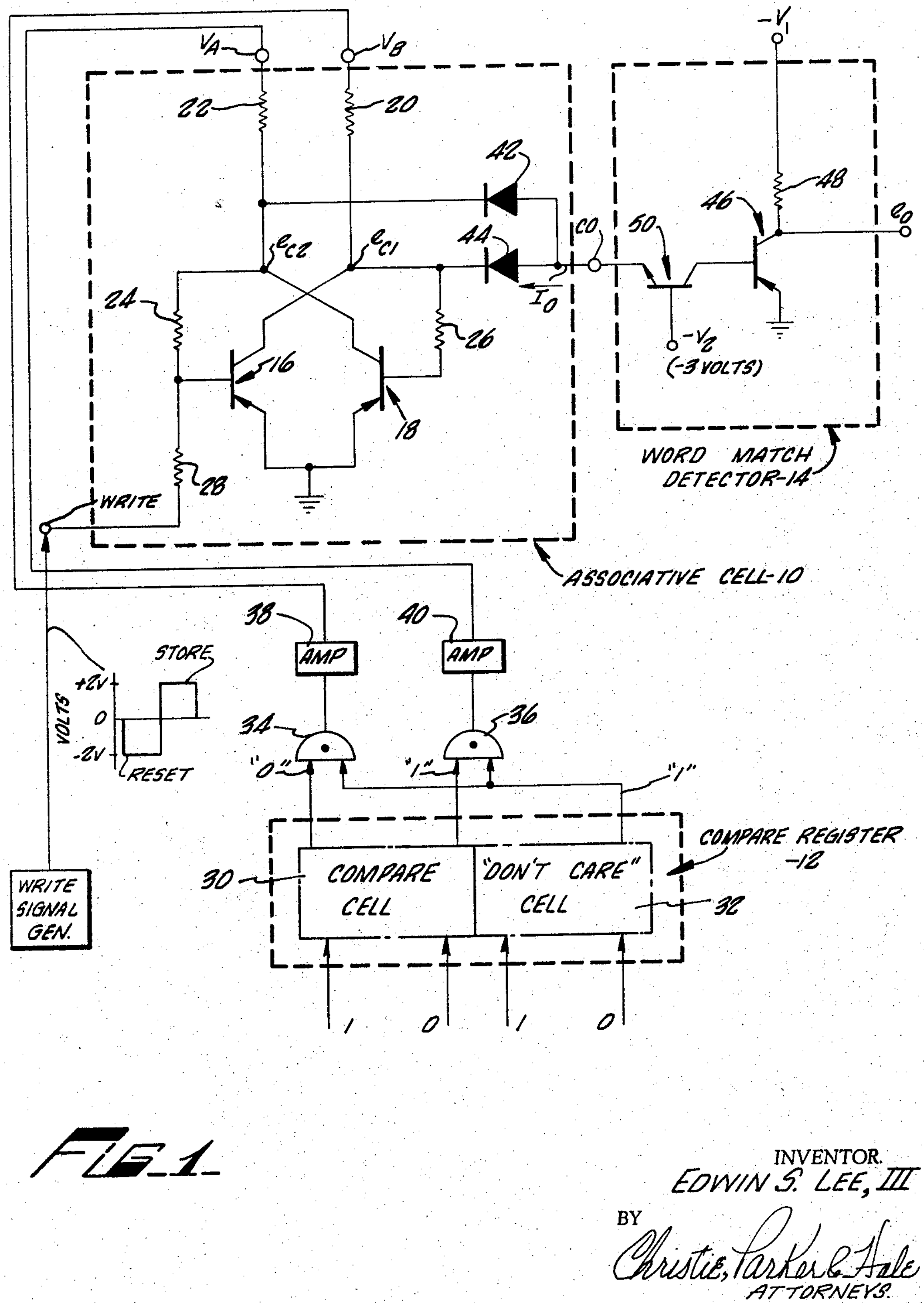
FIG. 1 is a schematic diagram of an associative cell and associated control circuits therefor disclosed in the co-pending application, Ser. No. 236,310.

The circuit of FIG. 1, which is disclosed in the copending patent application Ser. No. 236,310, of which the present invention is an improvement, will first be described so that the improvement of the present invention may be more clearly understood. The associative cell is referenced by the symbol 10 and is a bistable circuit. Associated with the cell 10 is a compare register 12 for providing signals to the associative cell 10, representative of states thereof, with which the storage content of the associative cell 10 is to be compared. A word match detector 14 is provided for forming an output signal at an output terminal referenced by the symbol $e_0$ indicative of the relative storage content of the associative cell 10 and the compare register 12. The associative cell 10 and compare register 12 are set to store either a 1 bit or a 0 bit. The compare register 12 has the additional feature of assuming a third state indicative of a "don't care" condition.

The associative cell 10 contains two PNP type transistors 16 and 18. The output or collector electrodes of the transistors 16 and 18 are serially connected through load resistors 20 and 22 to terminals referenced by the symbols $V_B$ and $V_A$. The control or base electrode of the transistor 18 is regeneratively cross coupled through impedance means to the output or collector electrode of the transistor 16 whereas the base electrode of the transistor 16 is regeneratively cross coupled through impedance means to the collector electrode of the transistor 18. A resistor 24 connects the base electrode of the transistor 16 to the collector electrode of the transistor 18 whereas a resistor 26 connects the base electrode of the transistor 18 to the collector electrode of the transistor 16. The input or emitter electrodes of the transistors 16 and 18 are connected together in common to a terminal which is connected to ground (0 volts potential). Separate sources of negative potentials are applied to the terminals $V_A$ and $V_B$ for rendering the associative cell 10 operative in one of two stable states. The impedance means including resistors 20, 22, 24 and 26 are arranged for biasing either of one of the transistors 16 and 18 into a fully saturated conductive condition while simultaneously biasing the opposite transistor into a fully nonconductive or cutoff condition. A write terminal is serially connected to the base electrode of the transistor 16 by means of an impedance means referred to as a series dropping resistor 28.

The compare register 12 contains a compare cell 30 and a "don't care" cell 32. The cells 30 and 32 are conventional bistable flip-flop circuits. The two states of the cells 30 and 32 are identified by referring to the cells as storing either a 0 bit or a 1 bit. The output circuit of the compare circuit 30 which receives a control signal when it is storing a 0 bit is connected to an AND gate 34. The output circuit of the compare cell 30 which receives a control signal when the compare cell 30 is storing a 1 bit is connected to the input of an AND gate 36. Another input of both of the AND gates 34 and 36 is connected to the output of the "don't care" cell 32 which receives a control signal when the cell 32 is storing a 1 bit.

The output circuit of the AND gates 34 and 36 are connected through signal amplifiers 38 and 40 to the $V_B$ and $V_A$ terminals, respectively.

The amplifier circuits 38 and 40 are conventional signal amplifier circuits which are responsive to a control signal applied at the input circuit thereof for applying a large negative signal of −6 volts potential to the connected terminals $V_B$ and $V_A$, respectively. In the absence of a control signal at the input circuit thereof, the amplifiers 38 and 40 are arranged for applying a small negative signal of −2 volts potential to the terminals $V_B$ and $V_A$, respectively. Thus it should be understood that the register 12 in conjunction with the amplifier 38 and the gate 34 form a separate and independent source of potential for the terminal $V_B$ from the source of potential formed by the register 12 in conjunction with the amplifier 40 and the gate 36 for the terminal $V_A$.

A detecting device consisting of a pair of asymmetrically conductive elements are provided for connecting the collector electrodes of the transistors 16 and 18 to an output terminal CO which is connected to the input circuit of the word match detector 14. The asymmetrically conductive elements are silicon type of rectifier diode 42 arranged with its anode and cathode electrodes connected to the output terminal CO and the collector electrode of the transistor 18 and a silicon type of rectifier diode 44 arranged with its anode and cathode electrodes connected to the output terminal CO and the collector electrode of the transistor 16, respectively. To be explained subsequently, the detecting device, including elements 42 and 44, are adapted for forming a unique output signal indicative of a predetermined relationship between the states, or storage content. of the associative cell 10 and the state represented by the signals applied to the terminals $V_A$ and $V_B$.

The word match detector 14 contains a PNP type of transistor 46 having its collector electrode connected to the output terminal $e_0$. The transistor 46 has its emitter electrode connected to ground, whereas its collector electrode is serially connected through a load resistor 48 to a negative source of potential (not shown) referred to by the symbol −V1. The base electrode of the transistor 46 is serially connected through the collector and emitter electrodes of an NPN type of transistor 50 to the output terminal CO. The collector electrode of the transistor 50 is connected to the base electrode of the transistor 46 whereas the emitter electrode thereof is connected to the output terminal CO. The base electrode of the transistor 50 is connected to a source of potential (not shown) referenced by the symbol −V2 which is a −3 volts source of potential.

With the details of the circuit diagram of FIG. 1 in mind, refer now to the operation of the circuits shown therein. Before explaining the operation, a few terms to be used in the discussion will be explained. The associative cell 10 is said to store a 0 bit when the transistor 16 is in a conductive condition and the transistor 18 is in a cutoff or non-conductive condition, and to store a 1 bit when the transistor 18 is in a conductive condition and the transistor 16 in a nonconductive condition. A false output signal is said to be formed at the $e_0$ output terminal whenever the control signal thereat is at ground potential (0 volts) and a true output signal is said to be formed whenever the output signal at the $e_0$ output terminal is at a negative potential equal approximately to that formed by the negative power supply —V1. Similarly, it will be noted that whenever the output current $I_0$ at terminal CO is essentially zero amperes, the unilateral conductive devices 42 and 44 are said to form a true output signal and whenever a current $I_0$ flows at terminal CO, the unilateral conductive devices 42 and 44 are said to form a false output signal. Whenever the "don't care" cell 32 is in a 0 state, it and the cell 30 together are said to be in a "don't care" state.

Figures 3, 4:
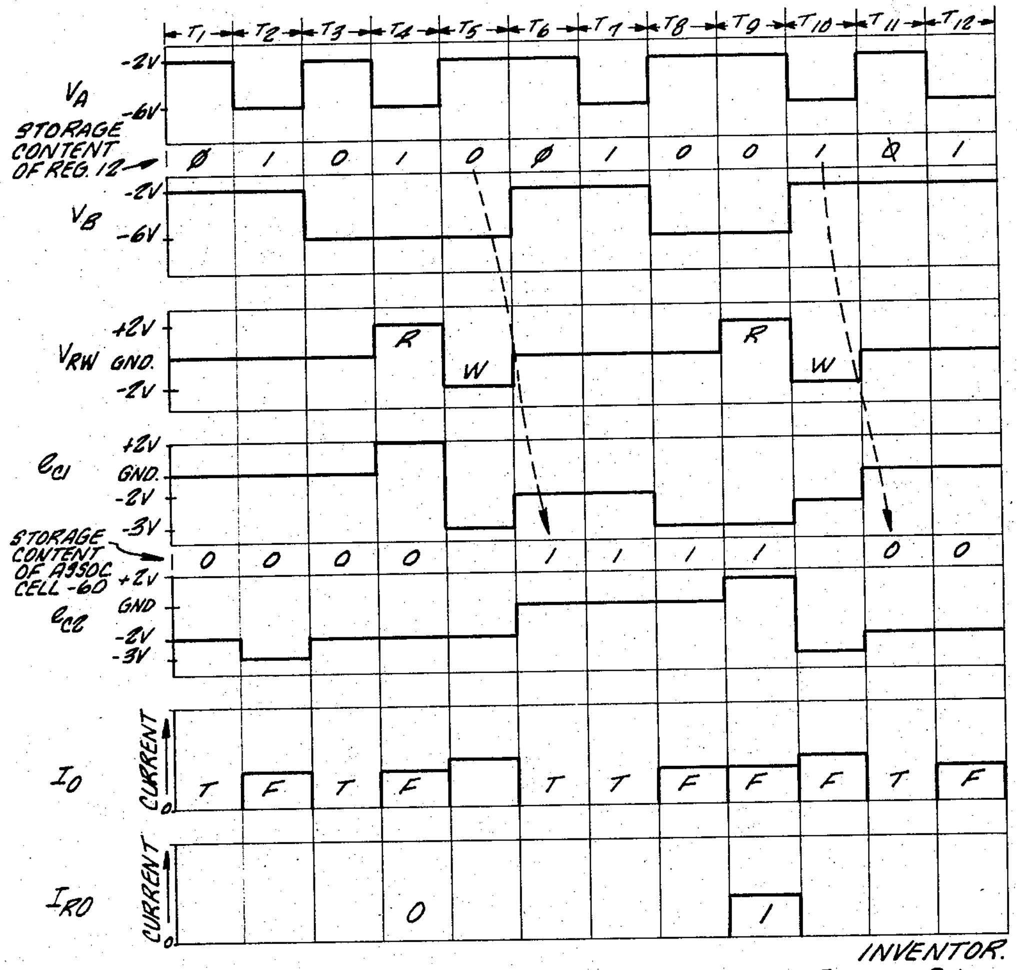
FIG. 3 is a sketch of a truth table for the associative cells and associated control circuits therefor shown in FIGS. 1 and 3.
FIG. 4 is a sketch of the wave forms of the signals at the indicated points in the associative cells and in control circuits therefor shown in FIG. 2.

The operation of the circuits shown in FIG. 1 are best understood with reference to the truth table shown in FIG. 3. As indicated in FIG. 3, true (T) and false (F) output signals are formed at the $e_0$ output circuit of the word match detector 14 indicative of a match and mismatch, respectively, between the states of the associative cell 10 and the compare cell 30. A true output signal is formed if the compare cell 12 and associative cell 10 are both storing either a 0 bit or a 1 bit. If the compare cell 12 and the associative cell 10 are storing a binary 1 bit and a 0 bit, respectively, or vice versa, the word match detector 14 forms a false output signal at the output terminal $e_0$.

The above-described true and false output signals for the word match detector 14 are formed assuming that the "don't care" cell 32 is storing a binary 1 bit. If the "don't care" cell 32 is storing a binary 0 bit (in a "don't care" state) it causes the word match detector 14 to form a true output signal at the $e_0$ output terminal regardless of the relative storage condition of the compare cell 30 and associative cell 10.

A write operation on the associative cell 10 of FIG. 1 will first be considered. A write signal generator 52 is provided for applying write control signals to the write terminal of the associative cell 10. Two phases of operation are required to write information into the associative cell 10. During the first phase of operation, the associative cell 10 is reset such that it stores a 0 bit. During he second phase of operation, the state of the associative cell 10 is switched back such that it stores a 1 bit provided a 1 bit is to be stored therein. The state into which the associative cell 10 is placed during the second phase of the write operation is determined by the control signals applied at the terminals $V_A$ and $V_B$. As will be explained, the associative cell 10 will always store the complement of the storage content of the compare cell 30 after a write operation. Also the "don't care" cell 30 always stores a 1 bit during a write operation.

Consider now the actual operation during writing. The write signal generator 52 forms a —2 volt reset signal followed by a +2 volt store signal which define the two phases of operation for writing in associative cell 10.

Assume now that the write signal generator 52 forms the above-mentioned —2 volt reset signal. The resistor 28 has a sufficiently low impedance relative to the impedance of resistors 24 and 20, that the transistor 16 is biased into a conductive condition regardless of the level of the signal applied at the terminal $V_A$ and the conductive conditions of the transistors 16 and 18. Thus, after the —2 volt reset signal, the associative cell 10 stores a 0 bit.

Assume now that the compare cell 30 stores a 0 bit and the "don't care" cell stores a 1 bit and a —2 volt signal and a —6 volt signal are applied to the terminals $V_A$ and $V_B$, respectively. Also assume that the write signal generator 52 now applies the +2 volt store signal to the write terminal. The impedances of the resistors 28, 24 and 22 are proportioned such that with such potentials at the write terminal and the $V_A$ and $V_B$ terminals, the transistor 16 is biased into a nonconductive condition. This causes the potential at the point $e_{C1}$ to drop towards the —6 volt potential applied at terminal $V_B$ and biases the transistor 18 into a conductive condition. Thus, after the output signal of the write signal generator 52 returns the write terminal to ground potential, the transistor 18 is in a conductive condition and the associative cell 10 is storing a binary 1 bit which is the complement of the 0 bit stored in the compare cell 30.

In contrast, assume that the compare cell stores a 1 bit and the potentials at the terminals $V_A$ and $V_B$ are reversed, a —6 volt signal and a —2 volt signal being applied to the terminals $V_A$ and $V_B$, respectively. Also assume that the write signal generator 62 has already formed a reset signal and has switched the associative cell 10 into a state wherein it stores a 0 bit with the transistor 16 in a conductive condition. Also assume that the write signal generator 52 now forms the +2 volt store signal. The impedance of the resistors 28, 24 and 22 are such that the +2 volt store signal applied at the write terminal does not switch the transistor 16 out of a conductive condition, thus after the signal at the write terminal returns to ground potential, the associative cell 10 still stores a binary 0 bit, which is the complement of the 1 bit stored in the compare cell 30. Thus, it should now be understood that associative cell 10 goes through two cycles during a write operation. First it is switched into a state wherein it stores a 0 bit and subsequently it is switched into a state corresponding to the signals applied at the terminals $V_A$ and $V_B$.

In a memory system, the associate cells 10 may be arranged in rows and columns with the write terminal of each associative cell 10 in a row connected in common to the output of a write signal generator such as 52. The terminals $V_A$ and $V_B$ of each of the associative cells 10 in each column may then be connected through amplifiers and gates similar to 34, 36, 38 and 40 to a bit of storage in an information register such as the register 12 shown in FIG. 1. In order to write the reset signal is first be applied to each of the cells in a row resetting such cells into a state storing a 0 bit and subsequently a store signal is applied to such associative cells causing them to store the complement of the bit stored in the corresponding cell in the information register.

Consider now a compare operation with reference to the circuit shown in FIG. 1, making reference to the truth table of FIG. 3. Assume initially that the associative cell 10 and compare cell 30 both store a binary 0 bit and that the "don't care" cell 32 stores a binary 1 bit. The AND gate 34 applies a control signal to the amplifier 38 causing a —6 volt signal to be applied at the terminal $V_B$. The AND gate 36 does not apply a control signal to the amplifier 40; therefore, a —2 volt signal is applied to the terminal $V_A$. The transistor 16 is in a conductive condition and the transistor 18 in a nonconductive condition causing the cathodes of the diodes 42 and 44 to be biased towards —2 volt potential and 0 volt potential, respectively. Since neither one of the diodes 42 and 44 has its cathode biased more negative than —3 volts, the diodes 42 and 44 and the transistor 50 are biased into nonconductive conditions causing the transistor 46 to be cut off. With the transistor in a cutoff or nonconductive condition, the output signal at the $e_0$ output terminal is a true signal.

Assume now that the associative cell 10 and compare cell 30 are both storing a 1 bit and that the "don't care" cell 32 is still storing a 1 bit. This causes —6 volt and —2 volt signals to be applied at the terminals $V_A$ and $V_B$, and the transistor 18 is in a conductive condition and the transistor 16 in a nonconductive condition. Thus, the control signals and the conductive conditions of the transistors are just reversed from that wherein both the cells 10 and 30 are storing a 0 bit. Again, neither of the diodes 42 and 44 have their cathodes biased more negative than −2 volts causing a true output signal at the output terminal $e_0$.

Assume now that the compare cell 30 and the associative cell 10 are storing binary bits 0 and 1, respectively, and that the "don't care" cell 32 is still storing a 1 bit. The amplifiers 38 and 40 apply −6 volt and −2 volt signals to the terminals $V_B$ and $V_A$, respectively, and the transistor 18 is in a conductive condition whereas the transistor 16 is in a nonconductive condition. These signal conditions cause the cathode of the diodes 42 and 44 to be biased towards 0 volt and −6 volt potential, respectively. Thus, the diode 44 becomes forward biased, forward-biasing the base emitter junction of the transistor 50 causing a current $I_0$ to flow through the collector emitter junctions of the transistor 50. This in turn causes the transistor 46 to be biased into a conductive condition and a false output signal is formed at the output terminal $e_0$. Thus, a false output signal indicates that there is a mismatch between the storage content of the compare and associate cells 30 and 10.

Similarly, a false output signal is formed when the associative cell 10 and compare cell 30 are storing 0 and 1 bits, respectively. The operation of the circuits are similar to that for the reverse storage conditions of the cells 10 and 30. However, under these storage conditions, the transistor 18 is in a conductive condition and the terminals $V_A$ and $V_B$ receive −6 volt and −2 volt control signals, respectively.

Assume now that the "don't care" cell 32 is storing a 0 bit thereby causing the compare cell 30 and "don't care" cell 32 to be in a "don't care" state. The amplifiers 38 and 40 both receive a control signal thereby causing the amplifiers to apply a −2 volt signal to both of the terminals $V_A$ and $V_B$. With both of the terminals $V_A$ and $V_B$ receiving a −2 volt control signal, neither of the diodes 42 and 44 are biased into a conductive condition. Therefore, the control signal at the $e_0$ output terminal is a true signal. It should now be understood that the current at the output terminal CO is zero and the signal at the output signal $E_0$ true regardless of the state of the associative cell 60 whenever the compare cell 30 and "don't care" cell 32 are in a "don't care" state.

In regard to the associative cell of FIG. 1, it should be noted that read out pulses may be obtained from the associative cell 10 by connecting gating and other appropriate detecting circuits to the collector electrodes of the transistors 16 and 18 to detect the state of the associative cell 10 as indicated by the conductive conditions of the transistors. However, read signals are required and a separate connection for the read signal must be made to such gate for each cell. This is undesirable in some applications especially in a memory system having many cells. It should also be noted that the circuit arrangement shown in FIG. 1 includes a write terminal at which write control signals are applied for controlling the writing of binary 1 and 0 bits into the associative cell 10. However, this arrangement requires separate control circuits and connections from those of the read control circuits for providing information corresponding to the 1 or 0 bit to be stored into the cell 10.

Figure 2:
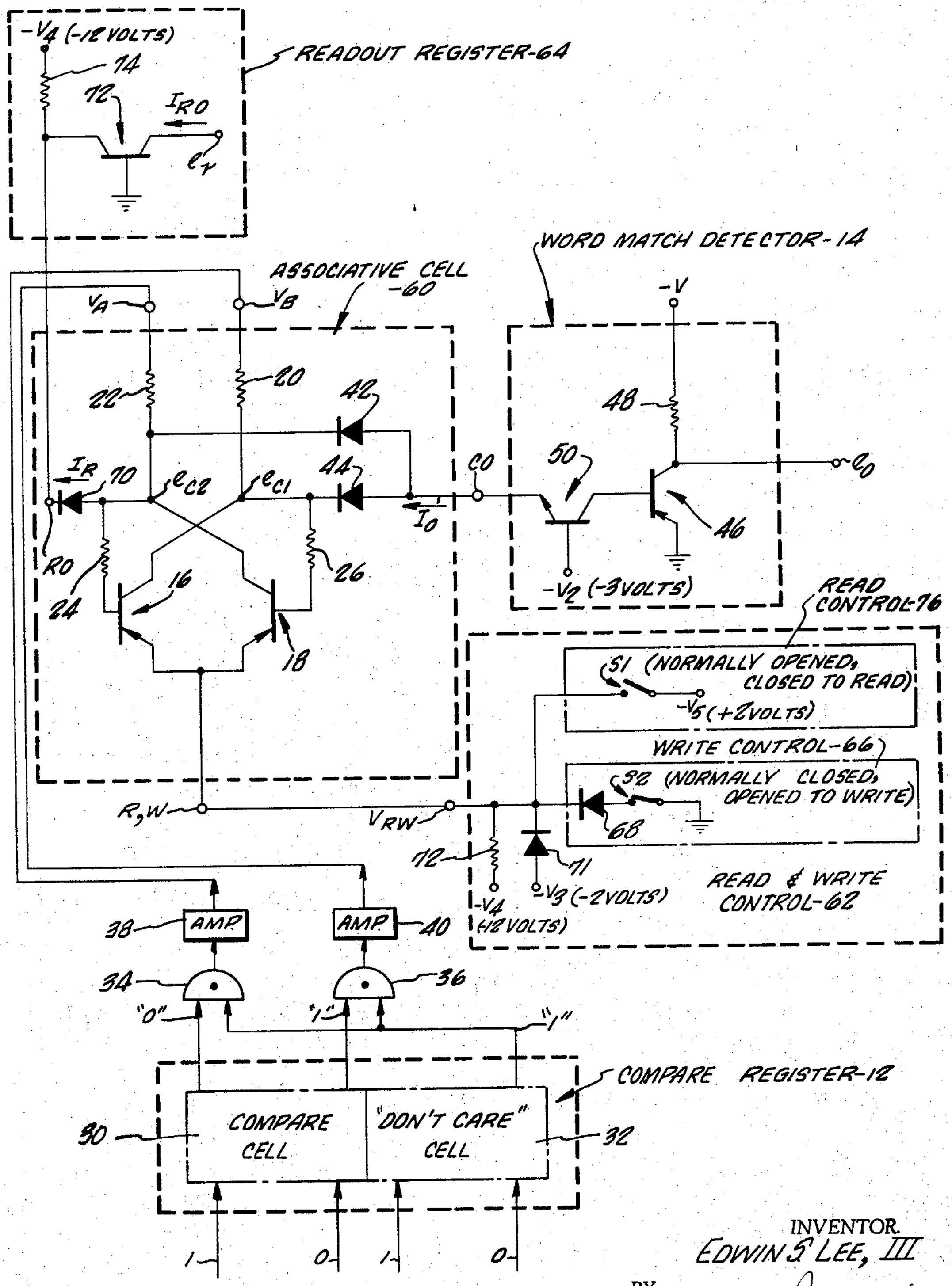
FIG. 2 is a schematic diagram of an associative cell and the control circuits therefor and embodying the present invention.

Refer now to the improved associative cell and associated control circuits shown in FIG. 2, which embodies the present invention. FIG. 2 includes an associative cell 60 which includes elements 16, 18, 22, 24, 26, 42 and 44, which are identical to and connected similar to that of the correspondingly numbered elements of the associative cell 10. However, in contrast to the associative cell 10 of FIG. 1, the common emitter connection of the transistors 16 and 18 is connected to a terminal referenced by the symbol R, W which receives both read and write control signals. The write control signals applied to the R, W terminal of the associative cell 60 cause bits to be stored into the associative cell 60 corresponding to the information stored in the compare register 12. Whenever a write control signal is applied to the R, W terminal, a binary bit opposite to that contained in the compare cell 30 is stored into the associative cell 60. Thus, if a binary 0 bit is stored in the compare cell 30, a binary 1 bit will be written into the associative cell 60.

A read and write control circuit 62 is provided for forming both read and write control signals at an output terminal thereof referenced by the symbol $V_{RW}$. The $V_{RW}$ output terminal is connected to the R, W terminal of the associative cell 60. A write control circuit 66 is provided in the read and write control circuit 62 for applying write signals to the R, W terminal. The write control circuit 66 includes a normally closed switch, referenced by the symbol S2, and a silicon type of rectifier diode 68. The switch S2 is arranged with its normally closed contact connected to the anode of the diode 68 and its pole connected to ground (0 volt potential). The cathode of the diode 68 is connected to the $V_{RW}$ output terminal of the read and write control circuit 62.

The read and write control circuit 62 also includes a diode 71 and a resistor 72 serially connected between two negative power supplies (not shown) and referenced by the symbols −V3 and −V4. The anode and cathode electrodes of the diodes 71 are connected to the −V3 power supply and one end of the resistor 72. The junction of the diode 71 and resistor 72 is connected to the cathode of the diode 68 and to the output terminal $V_{RW}$. The power supply −V3 is a −2 volts power supply, whereas the power supply −V4 is a −12 volts power supply.

Thus, the normally closed switch S2 normally connects the anode of the diode 68 to ground potential and the diode 71 and resistor 72 normally bias the diode 68 into a conductive condition causing the signal at the $V_{RW}$ output circuit and the signal at the R,W terminal to normally be at essentially ground potential (neglecting anode to cathode potential drop across diode 68). It should be noted that the operation of the associative cell 60 and the word match detector while the switch S2 is in a normally closed condition, is identical to that described with reference to FIG. 1.

Consider a write operation in the associative cell of FIG. 2. Assume now that the compare cell 30 and "don't care" cell 32 both store a binary 1 bit and that the associative cell 60 stores either a binary 0 or 1 bit. Also, assume that the pole of the normally closed switch S2 is opened. When the normally closed switch S2 is opened, the terminal $V_{RW}$ drops to −2 volts potential causing a −2 volts potential write signal to be applied to the R,W terminal. A −6 volt signal is also applied to the terminal $V_A$, whereas a −2 volt signal is applied to the terminal $V_B$. Under these signal conditions, the resistors 22 and 24 apply a negative signal to the base of the transistor 16 more negative than the −2 volt signal applied to the emitter electrode thereof, and thereby biases the transistor 16 into a conductive condition. However, the −2 volt signal applied to the terminal $V_B$ is equal to the −2 volt signal applied at the emitter electrode of the transistor 18; therefore, the resistors 20 and 26 apply a signal to the base electrode of the transistor 18 which is equal to the signal applied at the emitter electrode thereof. Thus, regardless of the previous storage content of the associative cell 60, the transistor 16 is switched into a conductive condition and the transistor 18 into a nonconductive condition, thereby causing a binary 0 bit to be stored into the associative cell 60. Thus, the complement of the storage content of the compare cell 30 is stored into the associative cell 60.

The normally closed switch S2 is then closed, causing the potential at the $V_{RW}$ output terminal to rise back to approximately ground potential leaving the associative cell 60 with a binary 0 bit stored therein.

Assuming that the compare cell 30 stores a binary 0 bit, a −6 volt signal is applied to the $V_B$ terminal, whereas a −2 volt signal is applied to the $V_A$ terminal. With reference to the above discussion, it should be evident that when a —2 volts write signal is applied to the $V_{RW}$ output terminal by opening the switch S2, a binary 1 bit is then written into the associative cell 60.

Another modification of the associative cell 60 over that shown in FIG. 1 is that the resistor 28, which is connected to the write terminal, is removed and a diode 70 is connected between the junction of the resistor 24 and the collector electrode of the transistor 18 and an output terminal referenced by the symbol RO. The diode 70 is a silicon type of rectifier diode 70 having its anode and cathode electrodes connected to the collector electrode and RO output terminal, respectively. To be explained in detail, whenever a read signal is applied to the R,W terminal, a unique output current pulse is formed at the RO output circuit indicative of the storage content of the associative cell 60.

The RO terminal may be connected to control circuits in a readout register such as that shown at 64 in FIG. 2. The portion of the readout register 64 shown in FIG. 2 contains an NPN type transistor 72 and a load resistor 74 for the transistor 72. The emitter electrode of the transistor 72 is connected serially through the resistor 74 to the —12 volt power supply —V4. The junction of the emitter electrode of the transistor 72 and the resistor 74 is connected to the RO output terminal. The base and the collector electrodes of the transistor 72 are connected to ground (0 volt potential) and an output terminal of the readout register 64 referenced by the symbol $e_r$.

To be explained in detail, the transmitter 72 is normally in a nonconductive or high impedance condition and is switched into a low impedance condition allowing a current $I_{RO}$ to flow through the collector-emitter electrodes thereof, whenever a read signal is applied to the R,W terminal while the associative cell 60 is storing a binary 1 bit. Hence, a low impedance condition of the transistor 72 in coincidence with a read signal at terminal R,W indicates that a binary 0 bit is contained in the associative cell 60, whereas high impedance or nonconductive condition thereof indicates a 1 bit is contained therein.

Refer again to the read and write control circuit 62. A read control circuit 76 is provided with a normally open switch, referenced by the symbol S1, for applying read control signals at the R,W terminal. The pole and contact of the normally open switch S1 are connected to +V5 power supply (not shown) and the $V_{RW}$ output terminal, respectively. The +V5 power supply is a +2 volts power supply. A +2 volt read signal is applied at the $V_{RN}$ output terminal whenever the switch S1 is closed.

Refer now to a read operation on the associative cell 60 with reference to the truth table shown in FIG. 3. Assume initially that the associative cell 60 stores a binary 0 bit. The transistor 16 is in a saturated conductive condition, whereas the transistor 18 is in a nonconductive condition. Assume now that the switch S1 is closed, causing a +2 volt read signal to be applied to the R,W terminal. Since the transistor 18 is in a nonconductive condition, the +2 volt signal applied at its emitter electrodes does not change the potential at the collector electrode thereof. Therefore, the potential at the collector electrode of the transistor 18 remains at approximately that applied to the terminal $V_A$, and the diode 70 does not raise the potential at the emitter electrode of the transistor 72 above ground. Thus, the transistor 72 remains in a conductive condition. Hence, a 0 bit is read out of the associative cell 60.

Assume now that the associative cell 60 stores a binary bit 1. A +2 volt read signal applied at the R,W terminal biases the emitter electrode of the transistor 18 to +2 volts. Since the transistor 18 is in a saturated conductive condition, its collector electrode also rises to about +2 volts potential (neglecting emitter to collector voltage drop) regardless of the potentials at $V_A$ and $V_B$. The +2 volt signal at the anode electrode of the diode 70 forward biases the diode 70 causing approximately a +2 volt signal to be applied to the emitter electrode of the transistor 72 switching it into a nonconductive or high impedance condition and inhibiting any output current through the collector and emitter electrode circuit thereof.

Thus, a 1 bit read out signal is formed at the terminal $e_r$. It should be noted that the above discussion applies regardless of storage content of the compare cell 30 and the "don't care" cell 32. It should also be noted that the signal at RO rises above 0 volts only when the associative cell 60 stores a binary 1 bit in coincidence with a read pulse. Hence, a unique output signal is formed at RO in coincident with a read signal whenever the cell 60 stores a 1 bit.

The wave shape diagram of FIG. 4 illustrates the different operations of the associative cell of CO. The lines $V_A$ and $V_B$ illustrate the voltages between ground and the terminals $V_A$ and $V_B$; the line $V_{RW}$ illustrates the voltage between the ground and the terminal $V_{RW}$; the lines $e_{C1}$ and $e_{C2}$ illustrate the voltages between ground and the terminals $e_{C1}$ and $e_{C2}$; and the lines $I_O$ and $I_{RO}$ illustrates the current flowing through the terminals CO and $e_r$, respectively. The wave shaped diagram of FIG. 4 may readily be understood with reference to the preceding discussion, and with reference to the following Table I which indicates the operation being performed and the current $I_O$ flowing at CO and the current $I_{RO}$ flowing at $e_r$ during time intervals $T_1$ through $T_{12}$ shown in FIG. 4.

*Table I*

$T_1$—Compare operation: wherein the associative cell 60 stores a 0 bit, the compare cell 30 and "don't care" cell 32 are in a "don't care" state ($\phi$) and current $I_O$ is equal to zero.

$T_2$—Compare operation: wherein the associative cell 60 stores a 0 bit, the compare cell 30 stores a 1 bit, the "don't care" cell 32 stores a 1 bit and the current $I_O$ flows.

$T_3$—Compare operation: wherein the associative cell 60 stores a 0 bit, the compare cell 30 stores a 0 bit, the "don't care" cell 32 stores a 1 bit and current $I_O$ is equal to zero.

$T_4$—Read out operation: wherein the associative cell 60 stores a 0 bit, the compare cell 30 stores a 1 bit, the "don't care" cell 32 stores a 1 bit, and the current $I_{RO}$ is equal to zero.

$T_5$—Write operation: wherein a 1 bit is written into the associative cell 60, the compare cell 30 stores a 0 bit, and the "don't care" cell 32 stores a 1 bit.

$T_6$—Compare operation: wherein the associative cell 60 stores a 1 bit, the compare cell 30 and "don't care" cell 32 are in a "don't care" state and current $I_O$ is equal to zero.

$T_7$—Compare operation: wherein the associative cell 60 stores a 1 bit, the compare cell 30 stores a 1 bit, the "don't care" cell 32 stores a 1 bit and current $I_O$ is equal to zero.

$T_8$—Compare operation: wherein the associative cell 60 stores a 1 bit, the compare cell 30 stores a 0 bit, the "don't care" cell 32 stores a 1 bit and current $I_O$ flows.

$T_9$—Read out operation: wherein the associative cell 60 stores a 1 bit, the compare cell 30 stores a 0 bit, the "don't care" cell 32 stores a 1 bit and current $I_{RO}$ flows.

$T_{10}$—Write operation: wherein a 0 bit is written into the associative cell 60, the compare cell 30 stores a 1 bit and the "don't care" cell 32 stores a 1 bit.

$T_{11}$—Compare operation: wherein the associative cell 60 stores a 0 bit, the compare cell 30 and "don't care" cell 32 are in a "don't care" state ($\phi$) and current $I_O$ is equal to zero.

$T_{12}$—Compare operation: wherein the associative cell 60 store a 0 bit, the compare cell 30 stores a 1 bit, the "don't care" cell 32 stores a 1 bit and current $I_O$ flows.

Figure 5:
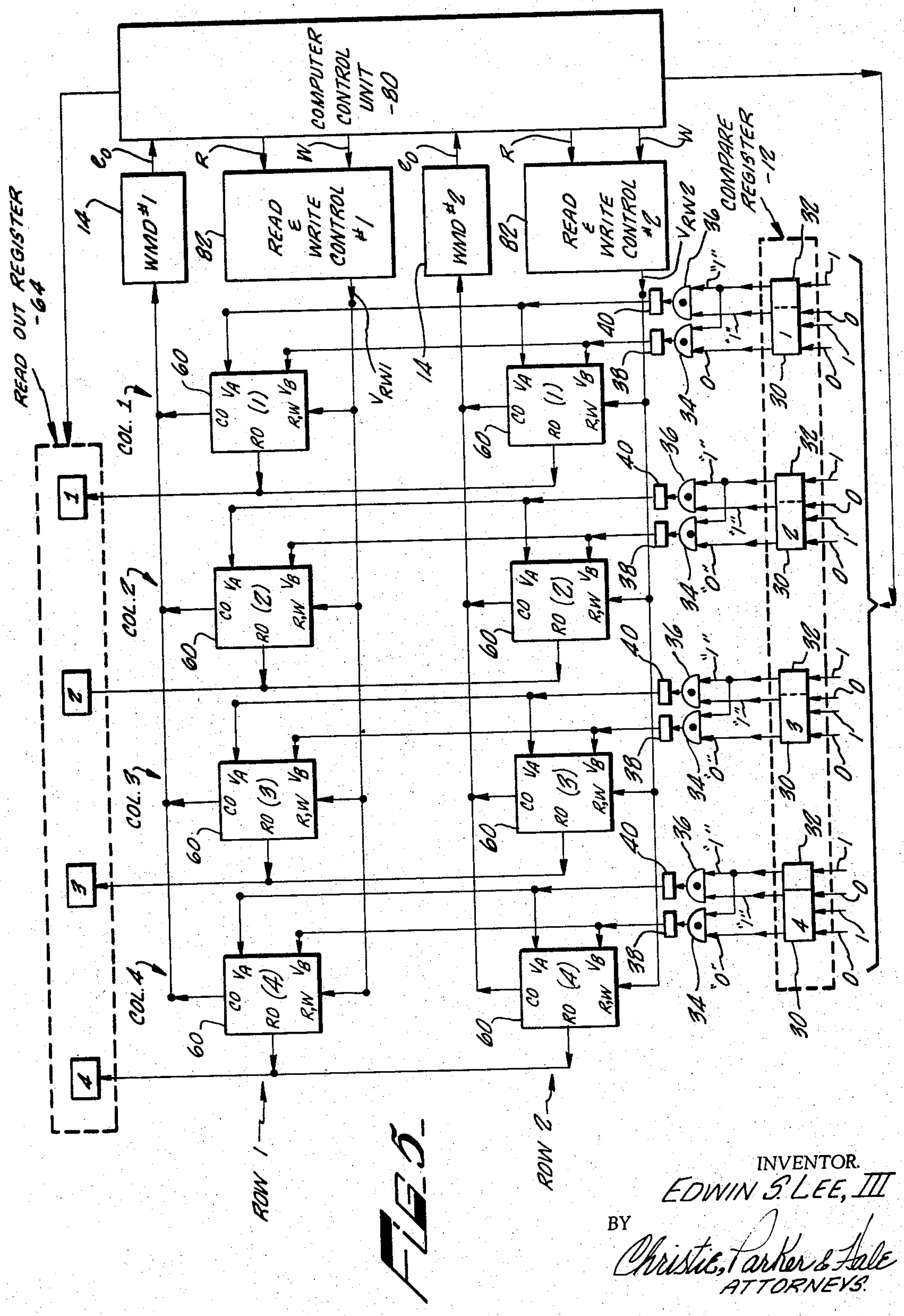
FIG. 5 is a block diagram of an associative memory system and embodying the present invention.

Refer now to the associative memory system shown in the block diagram of FIG. 5. The associative memory system of FIG. 5 contains associative cells 60 (shown in FIG. 2) arranged in rows and columns. Two rows, referred to as rows 1 and 2, are shown by way of example, each of which contains four associative cells arranged in four columns. The four associative cells in each row are numbered 1 through 4, moving from right to left in order to indicate the relative magnitude of the bits of information stored in each cell. Each row of associative cells is said to store one word of information composed of four binary bits.

Each associative cell 60 is shown in block form with input terminals and output terminals referenced by the symbols CO, $V_A$, $V_B$, RW and RO representative of the input and output treminals referenced by the same symbols as shown in FIG. 2. The output terminals CO of each of the associative cells 60 in row 1 are connected together in common to the input circuit of a word match detector 14 (WMD #1) identical to the word match detector shown and described with reference to FIGS. 1 and 2. Similarly, each of the associative cells 60 in row 2 are connected together in common to the input circuit of a second word match detector 14 (WMD #2). The word match detector 14 from rows 1 and 2 are hereinafter referred to as word match detectors #1 and #2, respectively.

Two read and write control circuits 82 are provided having output terminals $V_{RW1}$ and $V_{RW2}$, respectively. The output terminals $V_{RW1}$ and $V_{RW2}$ are connected in common to the R,W input terminals of each of the associative cells 60 in rows 1 and 2, respectively.

The read and write control circuits 82 are functionally similar to the read and write control circuit 62 described with reference to FIG. 2. However, for purposes of integration in a computer system, the mechanical switches are replaced by transistorized electronics switches of the type commonly used in the computer art.

Each read and write control circuit 82 has two input circuits referenced by the symbols R and W. A computer control unit 80 is provided for selectively applying control signals to the R and W input circuits of the read and write control circuit 82 for controlling the operation of the read and write circuits therein. Whenever the computer control unit 80 applies a control signal at the R input circuit of one of the read and write control circuits 82, it causes the circuit to form a +2 volts read pulse at the corresponding $V_{RW}$ output terminal. Whenever the computer control unit 80 applies a control pulse at the W input circuit of one of the read and write control circuits 82, it causes the circuit to form a −2 volts write signal at the corresponding $V_{RW}$ output terminal.

The readout register 64 shown by dashed lines in FIG. 2 is also shown in FIG. 5 but is shown with a full set four binary bits of storage. The four binary bits of storage are numbered 1 through 4 corresponding to the correspondingly numbered four columns of the associative memory system. Each of the four binary bits in the readout register 64 is a conventional flip-flop circuit including a transistorized read out circuit similar to that shown in FIG. 2 with gating connecting to the collector electrode of such transistor for setting the flip-flop into a state corresponding to the readout signal from the associative cell in the corresponding row which receives a read signal at the R,W terminal thereof. The associative cells 60 in column 1 have their output terminals RO connected together in common to the input circuit of the binary bit of storage 1 contained in the readout register 64. Similarly, the RO output terminals of the associative cells 60 in each individual one of the columns 2, 3 and 4 are connected together in common and connected to the corresponding binary bit of storage in the readout register 64.

The compare register 12 contains a pair of cells including a compare cell 30 and a "don't care" cell 32 indentical to those described with reference to FIG. 2 for each of the four columns in the associative memory. The four pairs of cells 30 and 32 of the compare register 12 are numbered 1 through 4 corresponding to the columns in the associative memory. The output circuits of the number 1 pair of cells 30 and 32 are connected through AND gates 34 and 36 and amplifiers 38 and 40 identical to the connection shown in FIG. 2. The output circuit of amplifier 40 is connected in common to the terminals $V_A$ of each cell 60 in column 1. Similarly, the output of amplifier 38 is connected to terminal $V_B$ of each of the cells 60 in column 1. Similar to the number 1 pair of cells 30 and 32, the number 2 through number 4 pairs of cells 30 and 32 are connected through the corresponding amplifiers in common to the corresponding terminals of the associative cells 60.

Consider now the operation of the associative memory system shown in FIG. 5. Assume initially that it is desired to store the binary word 1011 into row 1 of the associative memory shown in FIG. 5. The computer control unit 80 contains registers and gating circuits (not shown) which are necessary for storing the complement of the word 1011 or 0100 into the binary bits of storage 4 through 1, respectively, of the compare register 12. Subsequently, the computer control unit 80 forms a control signal at the W input circuit to the read and write control #1 causing a write pulse to be formed at the $V_{RW1}$ output terminal similar to the write signal described with reference to FIG. 2. The write signal applied at the $V_{RW1}$ output circuit is applied to the R, W input terminal of each of the associative cells 60 in row 1. This causes the binary word 1011 to be written into the columns 4 through 1 of row 1 as described in detail with reference to FIG. 2.

Consider a compare operation in the memory system. Assume that the computer operation is such that it is desired to detect the word of information containing the binary bits 1 and 0 in the 4 and 3 bit position of the words in the associative memory of FIG. 5. The computer control unit 80 is arranged for storing binary bits 1 and 0 into the compare cells 30 of bits 4 and 3 of the compare register 12. Also, the "don't care" cells 32 of bits 4 and 3 are set into a 1 state. However, it should be noted that the content of columns 2 and 1 of row 1 do not logically matter in this operation as it is desired only to find the word containing bits 1 and 0 in the 4 and 3 bit positions of the word. To this end, the computer control unit 80 stores a binary bit 0 into the "don't care" cell 32 of both bits 2 and 1 of the compare register 12. Also, assume that the columns 4 and 3 of row 2 both contain a binary 1 bit.

The word match detectors #1 and #2, as described with reference to FIG. 2, are arranged whereby a current signal at the CO output circuit of any one of the associative cells 60 in a particular row causes the word match detector to form a false output signal indicative of a failure of comparison between an associative cell 60 in such row and the corresponding bit of the compare register 12. Since binary 1 bits are stored in columns 4 and 3 of row 2, associative cell 60 in row 2, column 3 forms an output current at the CO output circuit indicative of the mismatch between it and the corresponding bit 3 of the compare register 12 which is storing a binary 0 bit. Thus, the word match detector #2 applies a false signal to the computer control unit 80.

However, columns 4 and 3 of row 1 have the same storage content as the compare cell 30 of bits 4 and 3 of the compare register 12. Hence, no control signal is formed at the CO output terminals of either of the associative cells in row 1, columns 4 and 3. Similarly, the bits 2 and 1 of the compare register 12 are in a "don't care" state. Hence, the associative cells in row 1, columns 2 and 1 also do not form output currents at the output terminal CO. The word match detector #1 detects a total lack of current from all of the output terminals CO of the associative cells 60 in row 1 and forms a true output signal at the $e_0$ output terminal thereof.

The computer control unit 80 is responsive to the true signal at the $e_0$ output terminal of word match detector #1 to perform any one of a number of specified computer control functions; for example, the computer control unit 80 may immediately form a control signal at the R input circuit of read and write control unit #1. Such a control signal causes the read and write control unit #1 to form a read pulse at the $V_{RW1}$ output terminal. A read signal at the $V_{RW1}$ output terminal causes the content of each of the associative cells 60 of row 1 to be read out and a signal corresponding to the storage content thereof to be stored into the corresponding bit of the readout register 64.

Thus, it should now be understood that an associative memory embodying the present invention is considerably simplified by the use of the associative cell 60 having a single read and write control terminal for each associative cell in a word which may be connected together to the output terminal of a read and write control circuit. The necessary logic and gating for providing read and write control signals to the associative cells are thereby minimized. Additionally, by the use of separate controls for applying separate potentials to the terminals $V_A$ and $V_B$, the compare and write logical circuits and associated storage circuits are minimized.

FIGS. 2 through 5 and the description thereof have been directed to the use of the invention in associative memory cells and associative memory systems. However, it should be understood that the invention also has important applications in memory systems other than those of the associative memory type.

Referring back to FIG. 2, it should be noted that up to this point the discussion has been limited to three unique combinations of signals levels applied to terminals $V_A$ and $V_B$, namely the following: Terminals $V_A$ and $V_B$ both −2 volts; terminals $V_A$ and $V_B$ at −2 volts and −6 volts potential, respectively; and terminals $V_A$ and $V_B$ at −6 volts and −2 volts potential, respectively. However, a fourth unique combination of signals could be applied to terminals $V_A$ and $V_B$, namely a −6 volt signal applied to both terminals. Such a combination of signals is quite useful for compare operations as such a combination of signals would cause the word match detector 14 to detect a mismatch as current $I_O$ would flow through terminal CO regardless of the state of the associative cell 60.

Figure 6:
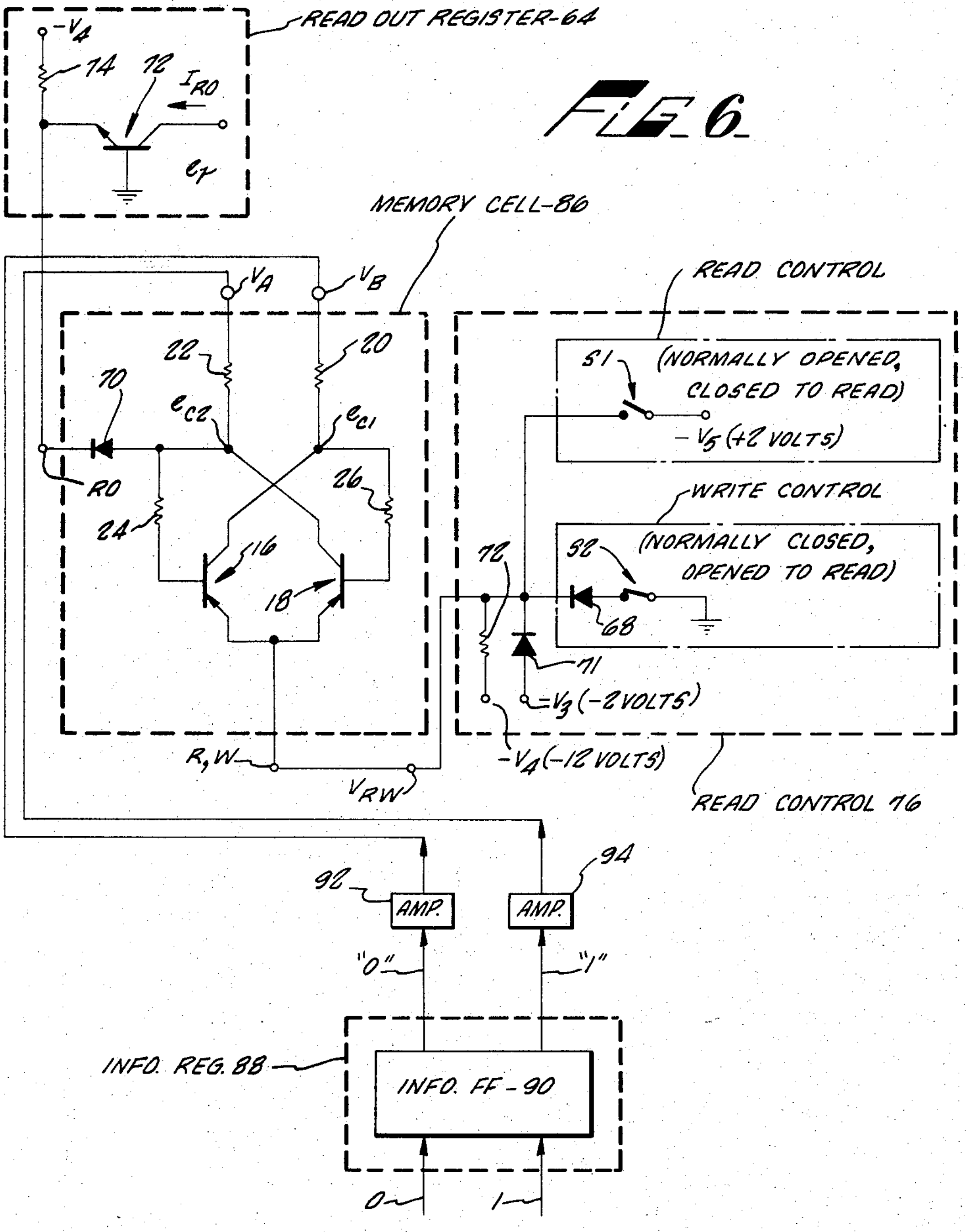
FIG. 6 is a schematic diagram of a memory cell and associated control circuits therefor and embodying the present invention.

Refer now to FIG. 6. FIG. 6 shows a memory cell 86 and associated control circuits therefor. The memory cell 86 is essentially the same as the associative cell 60 shown in FIG. 2 except that the detecting device, including the unilateral conductive elements 42 and 44, has been removed. The readout register 64 and read and write control circuit 62 of FIG. 2 are also shown in FIG. 6.

The memory cell 86 has storage readout and write capabilities which are extremely useful in memory systems and which are essentially the same as described with reference to FIG. 2. For example, whenever a +2 volt read signal is applied to the RW terminal by the read control circuit 76, a readout signal is formed at the $R_O$ terminal which is indicative of the storage content of the memory cell 86. The readout operation of the memory cell 86 is identical to that described in connection with the associative cell 60 of FIG. 2.

FIG. 6 shows an information register 88 and amplifiers 92 and 94 in place of the compare register 12, amplifiers 38 and 40 and the gates 34 and 36 of FIG. 2. An information flip-flop 90 is provided in the information register 88 for storing binary coded bits corresponding to those which are to be written in the memory cell 86. Whenever the information flip-flop 90 stores a binary 1 bit, it applies a control signal to the amplifier 94 causing the amplifier 94 to apply a −6 volt signal to the terminal $V_A$ and also the information flip-flop 90 removes the control signal from the input of the amplifier 92 causing it to apply a −2 volt signal to the terminal $V_B$. Similarly, when the information flip-flop 90 stores a binary 0 bit, the amplifier 92 receives a control signal and the amplifier 94 does not receive a control signal therefor, causing the amplifiers 92 and 94 to apply −6 volts and −2 volts signals to the terminals $V_A$ and $V_B$, respectively. With reference to the description in connection with FIG. 2, it should be evident that the memory cell 86 is arranged to store the complement of the binary bit stored in the information flip-flop 90. Thus, if the information flip-flop 90 contains a binary 0 bit and a write control signal is applied to the R,W terminal, the memory cell 86 is set so that it stores a binary 1 bit.

Figure 7:
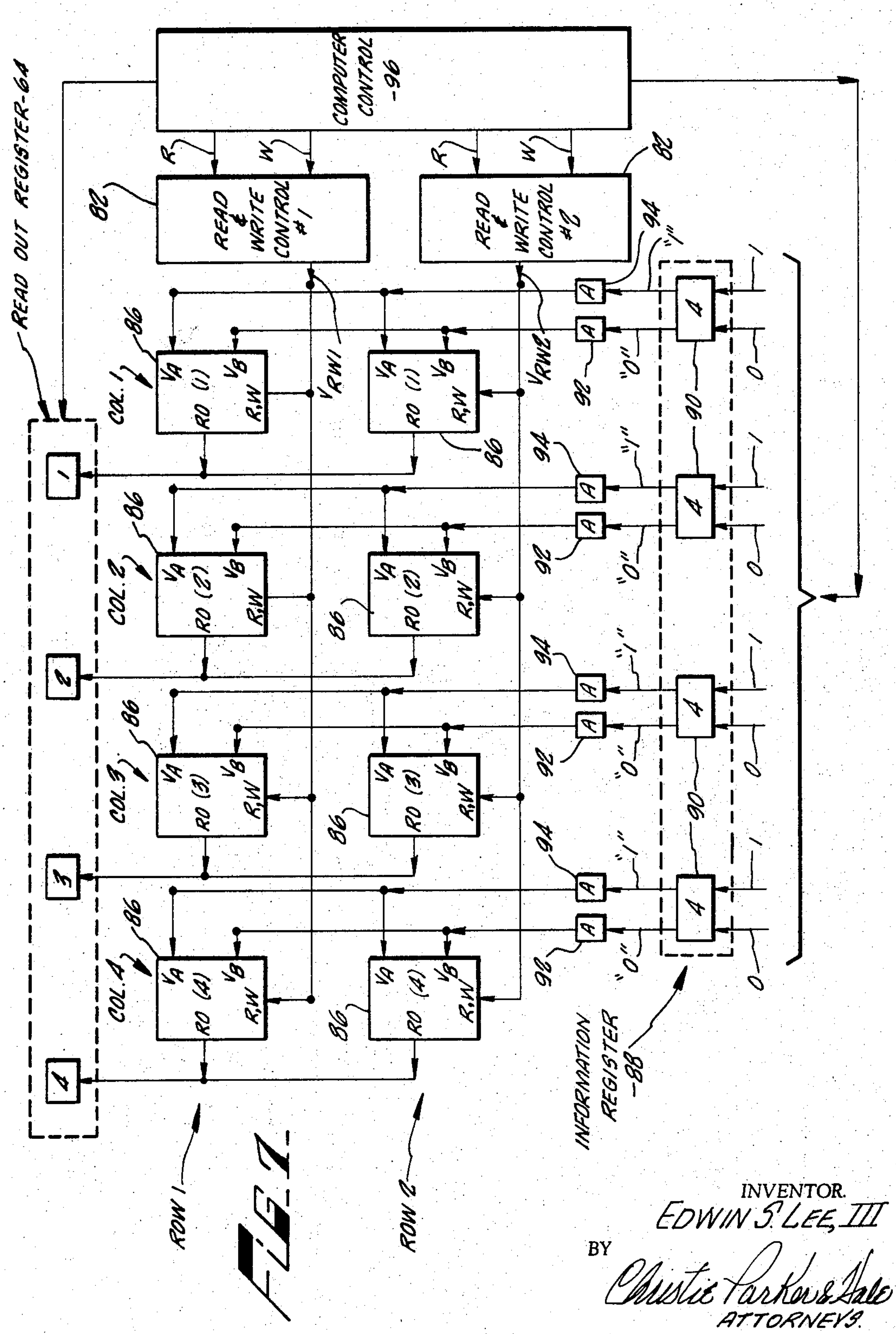
FIG. 7 is a block diagram of a memory system and embodying the present invention.

FIG. 7 shows a block diagram of a memory system containing the memory cells 86 and embodying the present invention. FIG. 7 is similar to the associative memory system shown in FIG. 5 except that memory cells 86 are used in place of the associative cells 60 and the word match detector 14 is removed. Also, the elements 30, 32, 34, 36, 38 and 40 are replaced by information flip-flop 90 and amplifiers 92 and 94. For example, column 1 has an information flip-flop 90 having its 0 output terminals connected through an amplifier 92 to the terminals $V_B$ of each of the cells 86 in column 1. Similarly, the 1 output terminal of the information flip-flop 90 of column 1 is connected through amplifier 94 to the $V_A$ terminal of each of the cells 86 in column 1.

A computer control unit 96 is shown in FIG. 7 in place of the computer control unit 80 of FIG. 5 and is oriented for use with the memory system of FIG. 7. The operation of the memory system of FIG. 7 is similar to that described with reference to FIG. 5 except that no compare operations are implemented therein.

It should be understood that although a separate readout register 64 is shown, by way of example, the readout register 64 and information register 88 could be combined into a single register and time shared according to whether readout or write operations are to take place.

What is claimed is:

1. A memory cell comprising first and second switching devices having input, output and control circuits, and impedance means for symmetrically connecting the output circuits of each of the switching devices to individual potential sources and for regeneratively cross coupling the output and control circuits for causing the switching devices to alternately conduct for defining two stable states, the input circuits of said switching devices being coupled together to a source of write control signals and the switching devices switching into a conductive state corresponding to that defined by a signal applied to the impedance means by such individual potential sources responsive to an applied write control signal.

2. In an associative memory system comprising first and second switching devices having input, output and control electrodes, compare storage means having at least two stable states and having an output circuit for each switching device at which signals are applied indicative of the state of the compare means, impedance means for symmetrically coupling each output electrode to the respective output circuit of the compare storage means and for regeneratively cross coupling the control and output electrodes to cause the switching devices to alternately conduct for defining two stable states, an output terminal, a pair of asymmetrical conductive elements each connected between an individual output electrode of the switching devices and the output terminal for forming a unique indication of a predetermined relationship between the storage state of the switching devices and the state of the compare means, a source of read and write control signals having an output terminal coupled in common to the input electrodes of said switching devices, the switching devices being adapted for switching into a state defined by the state of the compare means in response to the write control signal and adapted for causing a unique read out signal at one of said output electrodes indicative of a predetermined state of the switching devices responsive to the read control signal.

3. In an associative memory system comprising first and second switching devices having input, output and control electrodes, an individual source of potential for each switching device representing states for the switching devices, a separate impedance element for each switching device for coupling the output electrode thereof to the corresponding individual potential source, a separate impedance element for each switching device for regeneratively cross coupling the input electrode thereof to the output electrode of the other switching device for causing the switching devices to alternately conduct for defining two stable states, an output terminal, a pair of asymmetrical conductive elements each coupled between an individual output electrode of the switching devices and the output terminal for forming a unique indication of the relationship between the storage state of the switching devices and the state defined by the potential sources, and a source of read and write control signals, the input electrodes of said switching devices being coupled together in common to the source of read and write control signals and the switching devices being adapted for switching into a state defined by signals from the individual potential sources in response to write control signals and adapted for causing a unique read out signal at one of the output electrodes indicative of a predetermined state of the switching devices responsive to the read control signal.

4. In an associative memory system comprising first and second semiconductor switching devices having input, output and control electrodes, an individual source of potential for each semiconductor switching device defining states for the switching devices, a separate impedance element for each semiconductor switching device separately coupling the output electrode thereof to the corresponding individual potential source, a separate impedance element for each semiconductor switching device regeneratively cross coupling the input electrode circuit thereof to the output electrode of the other semiconductor device for causing the semiconductor switching devices to alternately conduct for defining two stable states, an output terminal, a pair of asymmetrical conductive elements each coupled between an individual output electrode of the semiconductor switching devices and the output terminal for forming a unique indication of a predetermined relationship between the storage state of the semiconductor switching devices and the state defined by the individual sources of potential, the input circuits of said semiconductor switching devices being connected together to a terminal and connected to a source of write and read control signals, the switching devices being adapted for switching into a state defined by the signals from the individual potential sources in response to a write control signal and an asymmetrical conductive element coupled to an output electrode for providing a unique signal indicative of a predetermined state of the switching devices in response to a read control signal.

5. A memory cell comprising first and second switching devices having input, output and control circuits, impedance means for coupling the output circuits of each of the switching devices to separate potential sources and for regeneratively cross coupling the control and output circuits for causing the switching devices to alternately conduct for defining two stable states, the input circuits of said switching devices being coupled together to a source of read control signals, and asymmetrical conductive means coupled to the output circuit of at least one of the switching devices and adapted for forming a unique signal indicative of a predetermined state of the switching devices in response to a read control signal applied at said input circuits which does not change the state of the switching devices.

6. In a memory system comprising a plurality of memory cells arranged in rows and columns the memory cells each comprising first and second switching devices having input, output and control circuits, impedance means for coupling the output circuits to a source of potential and for regeneratively cross coupling the output and control circuits for causing the switching devices to alternately conduct for defining two stable states, and circuit means coupled to the output circuit of at least one of the switching devices and adapted for forming a first signal indicative of a predetermined state of the switching devices in response to a read control signal applied to both of the input circuits of said switching devices; a source of read control signals for each row of cells in the memory system having an output circuit coupled in common to both of the input circuits of each of the memory cells in the corresponding row and arranged for applying read control signals thereto for simultaneously reading out the storage content of each of the memory cells in the row; and a storage device for each column in the memory system having an input circuit coupled in common to the circuit means of each memory cell for storing a signal in response to the first signal from any one of the memory cells in the corresponding column.

7. In a memory system as defined in claim 6 including an information storage device including a storage cell for each column in the memory system, each of the information storage cells having at least two stable states and at least two output circuits at which signals are formed representative of the states, the impedance means being arranged so that the output circuits of said switching devices are coupled through separate impedance means to a separate one of the output circuits of the corresponding information storage device and a source of write control signals for each of the rows in the memory system having an output circuit coupled in common to both of the input circuits of each of the memory cells in the corresponding row for applying write control signals thereto, the switching devices being adapted for switching into a state corresponding to the state of the corresponding information storage cell in response to a write control signal.

8. In a memory system comprising a plurality of memory cells arranged in rows and columns, the memory cells comprising first and second switching devices having input, output and control circuits, impedance means coupling the output circuits of each of the switching devices to a source of potential and regeneratively cross coupling the output and control circuits for causing the switching devices to alternately conduct for defining two stable states, and a detecting circuit means coupled to the output circuit of at least one of the switching devices and adapted for forming a first output signal indicative of a predetermined state of the switching devices in response to a read control signal applied in common to the input circuits of said switching devices; a source of read control signals for each row of cells in the memory system having an output circuit coupled in common to both of the input circuits of each of the memory cells in the corresponding row and arranged for applying read control signals thereto for simultaneously reading out the storage content of each of the memory cells in the row; and a storage device for each column in the memory system having an input circuit coupled in common to the detection circuit means of each memory cell thereof for storing a predetermined signal in response to a first output signal from any one of the memory cells in the corresponding column.

9. In a memory system comprising a plurality of memory cells arranged in rows and columns, each memory cell comprising first and second switching devices having input, output and control circuits, impedance means serially coupled to each output circuit and impedance means regeneratively cross coupling the output and control circuits for causing the switching devices to alternately conduct for defining two stable states; a source of write control signals for each row of cells in the memory system having an output circuit coupled in common to both of the input circuits of each of the memory cells in the corresponding row and arranged for applying write control signals thereto; and an information storage device for each column in the memory system having two states and at least two output circuits at which signals are formed corresponding to the state thereof, the output circuits of the information storage devices being coupled through the serial impedance means to the output circuit of a switching device of each cell in the corresponding column, the memory cells in each row being responsive to a write control signal applied thereto by the write control signal source for switching into a state corresponding to the state of the corresponding information storage device.

10. In a memory system comprising a plurality of memory cells arranged in rows and columns, the memory cells comprising first and second switching devices having input, output and control circuits, a pair of output terminals, impedance means separately coupling the output circuits of each of the switching devices to one of the output terminals and regeneratively cross coupling the output and control circuits for causing the switching devices to alternately conduct for defining two stable states; a source of write control signals for each row of cells in the memory system having an output circuit coupled in common to the input circuits of each of the switching devices in the corresponding row and arranged for applying write control signals thereto; and an information storage device for each column in the memory system having two stable states and at least two output circuits separately coupled to the output terminals of the memory cells in the corresponding column for applying signals to the output terminals indicative of the state thereof, said switching devices in each row switching into a state corresponding to the state of the corresponding information storage device in response to a write control signal from the corresponding write control circuit.

11. In a memory system having a plurality of memory cells arranged in rows and columns for storing binary coded information, the binary bits of the same binary order being arranged in the same column and the binary bits comprising a word being arranged in the same row, each of said memory cells comprising a two element solid state binary storage element having a common input terminal for receiving read and write control signals, a read-out terminal for deriving a signal indicative of the binary storage state of the element without changing the binary state thereof upon the application of a read-out signal to said common input terminal and information terminal means connected to each element comprising the cell for applying a binary signal to be stored in the cell, the cell being arranged and defined to store a binary signal in the cell only upon the coincidence of the application of a binary signal to the information terminal means and the application of a write signal to the common input terminal, an information, register comprising a plurality of storage cells for storing binary coded information to be written into the memory cells, the information cells storing bits of the same binary order being arranged in the same column with the corresponding memory cells and being connected in parallel circuit relationship with the information terminal means of each memory cell in the same column, a control register for providing signals indicative of the location of a group of memory cells for reading and writing into same, first means coupled to be responsive to the location signals from said control register coupled in common to the common input terminal of each memory cell of a row to couple a read-out signal thereto, and second means coupled to be responsive to the location signals from said control register and coupled in common to the common input terminal of each memory cell of a row to couple a write signal thereto.

12. In a memory system of the type defined in claim 11 including a read-out register comprising a plurality of storage cells for storing the signals read-out of the memory cells.

13. A memory cell comprising a two transistor flip-flop circuit, said circuit having a common input terminal for receiving read and write control signals, a read-out terminal for deriving a signal indicative of the binary state of the flip-flop upon the application of a read-out signal to said input terminal without altering the storage state of the flip-flop circuit, and a pair of information terminals for applying binary signals to be stored in the flip-flop circuit by alternately changing the conductive condition of the transistors, the circuit being arranged and defined to store a binary signal in the flip-flop circuit only upon coincidence of the application of the binary signals to the information terminals and the application of a write signal to the input terminal.

14. A memory cell comprising a two element solid state binary storage element, said element having a common input terminal for receiving read and write control signals, a read-out terminal for deriving a signal indicative of the binary storage state of the element without changing the binary state thereof upon the application of a read-out signal to said common input terminal, and information terminals means connected to each element comprising the cell for applying a binary signal to be stored in the cell, the cell being arranged and defined to store a binary signal in the cell only upon the coincidence of the application of a binary signal to the information terminal means and the application of a write signal to the common input terminal.

15. In a memory system comprising first and second switching devices having input, output and control circuits, means providing an individual signal for each of said switching devices defining at least two different states for said switching devices, impedance means for separately coupling the output circuits of each switching device to the corresponding one of said individual signals and for regeneratively cross coupling the output and control circuits for causing the switching devices to alternately conduct for defining two stable states, means for forming write control signals, the input circuits of said switching devices being coupled together in common to said write control signals, said switching devices switching into a conductive state corresponding to that defined by said individual signals applied to the impedance means responsive to an applied write control signal.

16. In a memory system comprising first and second switching devices having input, output and control circuits, means providing an individual signal for each of said switching devices defining at least two different signal combinations, impedance means for separately coupling the output circuits of each switching device to the corresponding one of said individual signals and for regeneratively cross coupling the output and control circuits for causing the switching devices to alternately conduct for defining two stable states, means for forming read control signals, the input circuits of said switching devices being coupled together in common to said read control signals and means coupled to an output circuit for forming a signal indicative of the state of said switching devices in response to said read control signal without changing the state of said switching devices.

17. In a memory system comprising first and second switching devices having input, output and control circuits, means providing an individual signal for each of said switching devices, the combination defining at least two different states for said switching devices, means for forming write control signals and for providing a second signal in the absence of the write control signal, said input circuits being coupled in common to said write control signals, impedance means for separately coupling the output circuits of the switching devices to the corresponding one of said individual signals, and impedance means for regeneratively cross coupling the output and control circuits for causing the switching devices to alternately conduct for defining two stable states, said individual signals having a level and the impedance means being proportioned in value such that one of said write control signals causes one of said switching means to switch into a conductive condition and the other into a non-conductive condition dependent on the combination of said individual signals and remain in such conductive and non-conductive conditions upon return of such write control signal to the second signal.

18. In a memory system comprising first and second switching devices having input, output and control circuits, means providing an individual signal for each of said switching devices the combination defining at least two different states for said switching devices, means for forming read control signals and for providing a second signal in the absence of the read control signal, said input circuits being coupled in common to said read control signals, impedance means for separately coupling the output circuits of the switching devices to the corresponding one of said individual signals, and impedance means for regeneratively cross coupling the output and control circuits for causing the switching devices to alternately conduct for defining two stable states, said individual signals having a level and the impedance means being proportioned in value such that one of said read control signals causes one of said switching means to provide a predetermined signal at said output circuit for predetermined conductive conditions of said switching devices and to remain in such conductive conditions upon return of such read control signal to the second signal.

19. In a memory system comprising first and second switching devices having input, output and control circuits, means providing an individual signal for each of said switching devices the combination defining at least two different states for said switching devices, means for forming write and read control signals and for providing a third signal in the absence of the write and read control signals, said input circuits being coupled in common to said write and read control signals, impedance means for separately coupling the output circuit of the switching devices to the corresponding one of said individual signals, and impedance means for regeneratively cross coupling the output and control circuits for causing the switching devices to alternately conduct for defining two stable states, said individual signals having a level and the impedance means being proportioned in value such that one of said write control signals causes one of said switching means to switch into a conductive condition and the other into a non-conductive condition dependent on the combination of said individual signals and a read control signal causing a predetermined signal to be formed at said output circuits indicative of the conductive conditions of said switching devices without changing the conductive states thereof.

20. In a memory system comprising first and second switching devices having input, output and control circuits, an individual source of information signals for each switching device, first impedance means for each switching device for individually coupling the output circuit of the corresponding switching devices to the corresponding information signal, second impedance means for regeneratively cross coupling the control circuit of each switching device to the output circuit of the other switching device for causing the switching devices to alternately conduct for defining two stable states, and means for providing read and write control signals, the input circuits of such switching devices being coupled together in common to said read and write control signals, a write control signal causing said switching devices to switch into conductive conditions defined by said information signals and a control signal causing a predetermined output signal at said output circuits indicative of the states of said switching devices.

21. An associative memory cell comprising first and second switching devices having input, output and control circuits, a first output terminal, the input circuits of said switching devices being coupled in common to said first output terminal for receiving read control signals, second and third output terminals, individual impedance means for coupling the output circuit of each of the switching devices to a different one of said second and third output terminals, impedance means for regeneratively cross coupling the output and control circuits to cause the switching devices to alternately conduct for defining two stable states, a fourth output terminal, an asymmetrically conductive device coupled between said fourth terminal and an output circuit for forming a predetermined output signal indicative of a state of the switching devices in response to a read control signal applied to said first output terminal, a fifth output terminal, a pair of asymmetrical conductive elements connected between the output circuits of the switching devices and the fifth output terminal for forming a unique output signal indicative of a predetermined relationship between the storage state of the switching devices and the state represented by such individual potential sources.

22. An associative memory cell comprising first and second switching devices having input, output and control circuits, a first output terminal, the input circuits of said switching circuits being coupled in common to said first output terminal for receiving read and write control signals, second and third output terminals, individual impedance means for coupling the output circuits of each of the switching devices to a different one of said second and third output terminals for receiving signals representing information, impedance means for regeneratively cross coupling the output and control circuits to cause the switching devices to alternately conduct for defining two stable states, fourth and fifth output terminals, a pair of detecting elements coupled between an individual output circuit of the switching devices and the fourth output terminal for indicating the relationship between the storage state of the switching devices and a state represented by signals applied to the second and third output terminals, and a detecting element coupled between an output circuit and the fifth output terminal for indicating the storage state of the switching devices in response to a read control signal applied to said first terminal without changing the states of the switching devices and said first and second switching devices switching into a state represented by signals applied to said second and third terminals in response to a write control signal applied to said first terminal.

23. An associative memory cell comprising first and second switching devices having input, output and control circuits, impedance means for symmetrically coupling each of said output circuits to individual potential sources and for regeneratively cross coupling the output and control circuits for causing the switching devices to alternately conduct for defining two stable states, the input circuits of said switching circuits being coupled together to a source of read control signals for the conductive state of the switching devices, a first detecting device coupled to the output circuits of the switching devices for detecting and indicating the relationship between the storage state of the switching devices and a state represented by potentials from such individual potential sources, and a second detecting device coupled to at least one of the output circuits for detecting and providing an indication of the storage state of the switching devices in response to a read control signal which does not change the state of said switching devices.

24. A memory cell comprising first and second transistors having input, output and control electrodes, means for connecting the input electrodes to a source of read control signals, individual impedance means coupled between the control electrode of each of the transistors and the output electrode of the other transistor, first output impedance means connected to one of the output electrodes and having its opposite end defining a first output terminal, second output impedance means connected to the other output electrode and having its opposite end defining a second output terminal, and an asymmetrically conductive device connected to one of the output electrodes and having an output defining a third output terminal, a read control signal causing a read out signal at the third terminal indicative of a predetermined state of the transistors.

References Cited

UNITED STATES PATENTS

| | | | |
|---|---|---|---|
| 2,920,215 | 1/1960 | Lo | 307—88.5 |
| 2,927,242 | 3/1960 | Schultz | 307—88.5 |
| 3,043,964 | 6/1962 | Seidman | 307—88.5 |
| 3,067,336 | 12/1962 | Eachus | 307—88.5 |

| | | | |
|---|---|---|---|
| 3,031,650 | 4/1962 | Koerner | 340—173 X |
| 3,093,814 | 6/1963 | Wagner et al. | 340—173 X |
| 3,114,053 | 12/1963 | Robinson | 328—206 X |
| 3,193,702 | 7/1965 | Claessen | 328—206 X |
| 3,197,693 | 7/1965 | Anderson | 340—166 X |
| 3,334,336 | 8/1967 | Koerner | 340—173 |

BERNARD KONICK, *Primary Examiner.*

J. BREIMAYER, *Assistant Examiner.*

U.S. Cl. X.R.

340—172.5; 307—291; 328—203, 206

UNITED STATES PATENT OFFICE
CERTIFICATE OF CORRECTION

Patent No. 3,418,639 December 24, 1968

Edwin S. Lee III

It is certified that error appears in the above identified patent and that said Letters Patent are hereby corrected as shown below:

Column 3, line 22, "FIGS. 1 and 3" should read -- FIGS. 1 and 2 --. Column 4, line 49, "content." should read -- content, --. Column 5, line 45, "he" should read -- the --. Column 10, line 74, "store" should read -- stores --. Column 11, line 16, "treminals" should read -- terminals --. Column 13, line 33, "signals" should read -- signal --; line 34, after "both" insert -- at --. Column 17, line 5, after "being" insert -- separately --; line 54, "information," should read -- information --. Column 18, line 22, "terminals" should read -- terminal --. Column 19, line 70, after "a" insert -- read --.

Signed and sealed this 24th day of March 1970.

(SEAL)
Attest:

Edward M. Fletcher, Jr.
Attesting Officer

WILLIAM E. SCHUYLER, JR.
Commissioner of Patents